United States Patent [19]

Aono

[11] 4,103,695

[45] Aug. 1, 1978

[54] METHOD OF AND DEVICE FOR CONTROLLING SOLENOID OPERATED FLOW CONTROL MEANS

[75] Inventor: Shigeo Aono, Seki, Japan

[73] Assignee: Nissan Motor Company, Limited, Japan

[21] Appl. No.: 629,094

[22] Filed: Nov. 5, 1975

[30] Foreign Application Priority Data

Nov. 6, 1974 [JP] Japan ................................ 49/127654
Mar. 7, 1975 [JP] Japan ................................ 50/26962

[51] Int. Cl.[2] ......................... F16K 31/06; F02M 7/12

[52] U.S. Cl. ......................................... 137/1; 251/129; 123/119 EC

[58] Field of Search ............................... 251/141, 129; 123/32 EA, 119 EC, 32 E; 60/276, 285; 318/631

[56] References Cited

U.S. PATENT DOCUMENTS

| | | | |
|---|---|---|---|
| 3,430,536 | 3/1969 | Oelrich | 91/47 |
| 3,470,892 | 10/1969 | Barker | 251/141 |
| 3,659,631 | 5/1972 | Rakoske | 251/129 X |
| 3,778,025 | 12/1973 | Lane et al. | 251/129 |
| 3,782,347 | 1/1974 | Schmidt et al. | 123/32 EA |
| 3,861,366 | 1/1975 | Masaki et al. | 123/119 EC |
| 3,874,407 | 4/1975 | Griswold | 251/129 X |

FOREIGN PATENT DOCUMENTS 1,180,982 2/1970 United Kingdom.

*Primary Examiner*—Arnold Rosenthal

[57] ABSTRACT

A solenoid operated fluid flow control valve having intrinsic linear or non-linear signal-to-output characteristics is controlled by a train of pulses produced by modifying a given analog signal with a dither signal having a waveform which is selected to modify the linear characteristics of the valve into non-linear apparent characteristics or the non-linear characteristics into apparent linear characteristics or into apparent non-linear characteristics which are different from the intrinsic flow characteristics of the valve.

8 Claims, 15 Drawing Figures

FIG. 3a
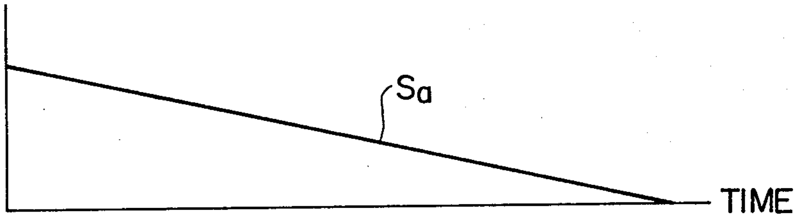
FIG. 3b
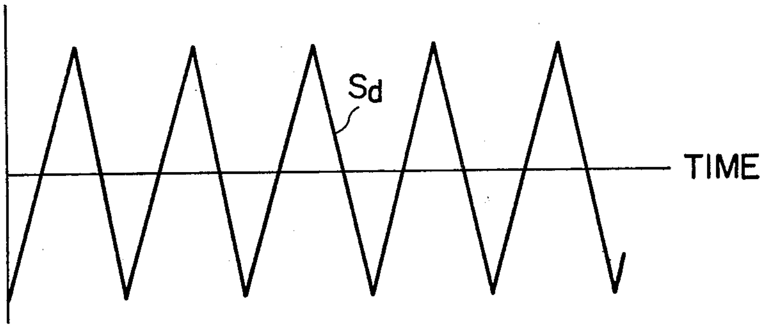
FIG. 3c
FIG. 3d
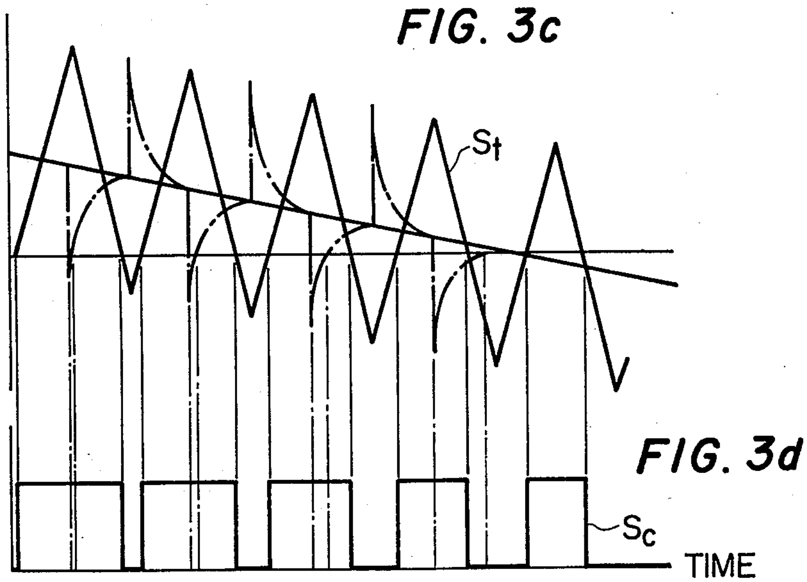

METHOD OF AND DEVICE FOR CONTROLLING SOLENOID OPERATED FLOW CONTROL MEANS

The present invention relates to a method of and a device for controlling solenoid operated fluid flow control means such as a solenoid operated fluid metering valve or flow regulator valve for use in a pneumatic or hydraulic circuit or a fuel feed network of, for example, a mixture supply system of an automotive internal combustion engine.

While the method and device herein proposed may prove useful for the control of various types of flow control means, the present invention will be described as being applied to a solenoid operated fluid metering valve for controlling the flow rate of air, fuel or the mixture of air and fuel of a mixture supply system, such as a carburetor or a fuel injection system, of an automotive internal combustion engine or the flow rate of exhaust gases recirculated into the mixture supply system as is practised.

As is well known in the art, a mixture supply system of an automotive internal combustion engine is usually equipped with various kinds of devices for controlling the exhaust emissions and coping with transient operating conditions of the engine during, for example, acceleration, deceleration or cold driving of the engine. In the case of a carburetor, such extra devices include a choke, a fast idle cam to hold the throttle valve of the carburetor slightly open after the engine has been warmed up, low-speed air and fuel feed circuits, and a high-speed fuel delivery circuit including an accelerator pump. These devices are required to compensate for the mixture supply characteristics dictated by the fluid metering characteristics of the carburetor throttle valve, main fuel discharge nozzle or any other basic components of the carburetor.

Each of the extra air or fuel feed devices above-mentioned is usually provided with a solenoid operated flow control or metering valve or valves of the two-position or binary-acting type having open and closed conditions or the analog or linearly-acting type capable of continuously varying the flow rate. If, in this instance, the two-position or binary-acting valve is arranged so as to feed air or fuel at a constant rate for a period of time determined to suit the desired or detected operating conditions of the engine, it is impossible to achieve an optimum result because, in the case of the solenoid operated valve incorporated in an extra fuel delivery arrangement for use under heavy-load conditions of the engine, extra fuel would be continuedly and constantly supplied to the engine irrespective of the variation of the load on the engine even after the engine load has been reduced below the level necessitating the supply of the additional fuel. To enable the valve to faithfully follow the operating conditions of the engine, therefore, it is preferable that the valve be controlled continuously or linearly in accordance with the load on the engine. Such a function can be achieved if a solenoid operated valve of the analog or linearly-acting type is used in lieu of the two-position valve. It is, however, pointed out that the analog or linearly-acting valve usually involves a time lag between an instant at which a control signal is supplied to the valve and an instant at which the valve is initiated into action and, for this reason, the output of the valve tends to vary in a non-linear fashion so that the valve fails to produce its intrinsic function if the valve is controlled directly by the control signal.

All these drawbacks are inherent in the conventional solenoid operated valves for use with not only automotive engines but any other equipment involving the control of flow rates of fluid.

It is, therefore, an important object of the present invention to provide a method of controlling solenoid-operated flow control means in such a manner as to pertinently modify the basic or intrinsic linear or non-linear signal-to-output characteristics of the control means in accordance with a given analog signal.

It is another important object of the present invention to provide a device putting such a method into practice.

In accordance with one outstanding aspect of the present invention, there is provided a method of controlling fluid flow control means, comprising producing a basic analog signal representative of desired output characteristics of the control means and a steady-state dither signal having a predetermined oscillation frequency, modifying the basic signal with the dither signal for producing a binary signal digitally representative of the basic analog signal, and controlling the flow control means with the binary signal, the dither signal having a waveform selected to pertinently modify the output characteristics of the control means. If the control means is of the type intrinsically having non-linear signal-to-output characteristics, the waveform of the dither signal may be selected in such a manner as to compensate for the non-linear characteristics and to produce either substantially linear characteristics or non-linear characteristics different from the initial non-linear characteristics. If the control means is of the type intrinsically having linear signal-to-output characteristics, then the waveform of the dither signal may be selected to modify the intrinsically linear characteristics into non-linear characteristics not only approximating the initially given basic analog signal but satisfying prescribed operational requirements.

In accordance with another outstanding aspect of the present invention, there is provided a device for controlling fluid flow control means, comprising means for producing a basic analog signal representative of desired output characteristics of the control means, means for producing a steady-state dither signal having a predetermined oscillation frequency, means for modifying the basic analog signal and producing a binary signal digitally representative of the basic analog signal, and means for controlling the flow control means with the binary signal, the aforesaid dither signal having a waveform selected to pertinently modify the output characteristics of the control means.

The term "linear" characteristics of flow control means herein referred to means such a relationship in which the flow rate of fluid through the control means varies in direct proportion to the signal which varies continuously with a variable such as time or control voltage. The "non-linear" characteristics thus refer to characteristics lacking in such a relationship.

The features and advantages of the method and device according to the present invention will become more apparent from the following description taken in conjunction with the accompanying drawings, in which.

Figure 2:
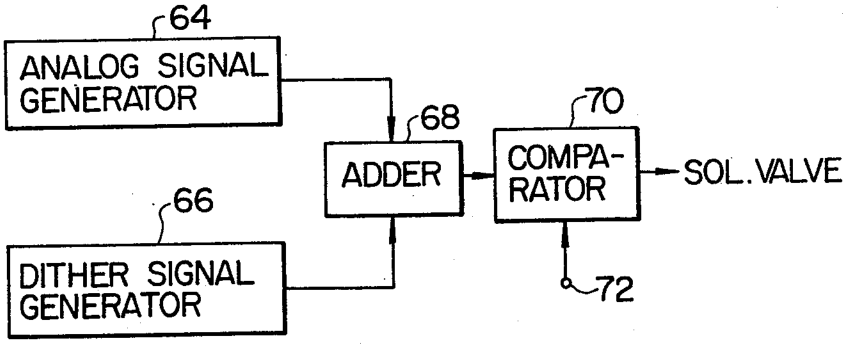
FIG. 2 is a block diagram illustrating an example of an electric control circuit for use with a solenoid operated fluid flow control valve incorporated in, for example, the fuel and air supply arrangement of the carburetor shown in FIG. 1.
Figure 5A:
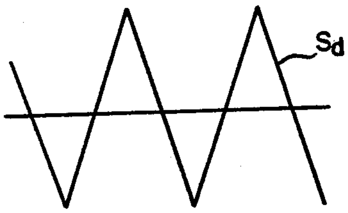
Figure 4:
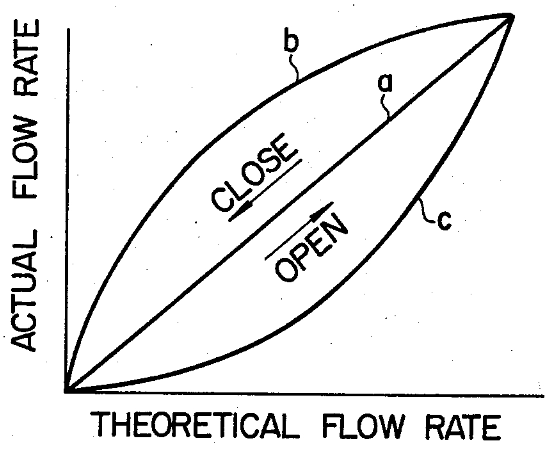

FIGS. 3*a* to 3*d* are diagram showing examples of the waveforms (indicated by full lines) of the signals produced in the control circuit shown in FIG. 2 and preferred examples of the waveforms of the signals which may be produced in accordance with the present invention;

FIG. 4 is a graph showing examples of the relationship between the variation in the theoretical flow rates of different types of solenoid operated fluid flow control valves and the variation in the flow rates actually achieved by the valve;

FIG. 5*a* is a diagram showing part of the waveform illustrated in FIG. 3*b;*

Figure 5B:
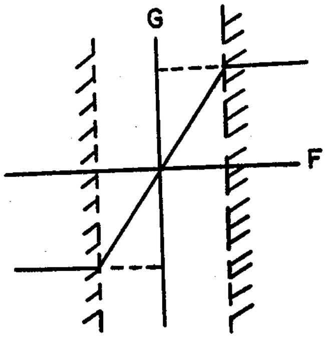

FIG. 5*b* is a graph showing the flow rate characteristics resulting from the dither signal illustrated in FIG. 5*a;*

Figure 6A:
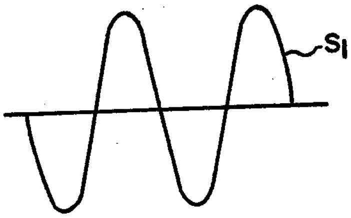
Figure 6B:
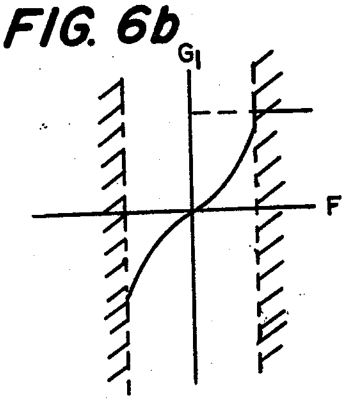

FIGs. 6*a,* 7*a* and 8*a* are similar to FIG. 5*a* but show preferred examples of the waveforms of the dither signals which can be utilized in accordance with the present invention; and FIGS. 6*b,* 7*b* and 8*b* are similar to FIG. 5*b* but show the flow characteristics resulting from the dither signals having the waveforms illustrated in FIGS. 6*a,* 7*a* and 8*a,* respectively.

Figure 1:
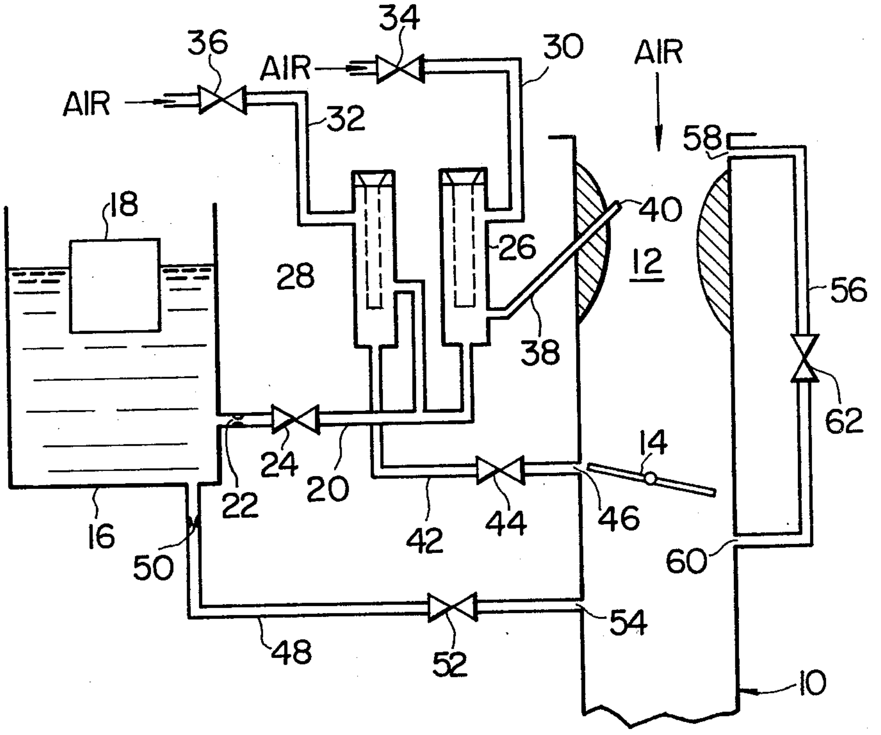
FIG. 1 is a schematic view showing a general arrangement of a carburetor of an automotive internal combustion engine.

Referring to the drawings, first to FIG. 1, a carburetor of an automotive internal combustion engine comprising a mixture delivery pipe 10 having a venturi 12 located downstream of an air cleaner (not shown) and a carburetor throttle valve 14 located between the venturi 12 and an intake manifold (not shown) of the engine. Fuel is supplied from a fuel tank (not shown) and is temporarily stored in a float bowl 16 having a float 18. A fuel feed passageway 20 leads through a restriction or orifice 22 from the float bowl 16 and terminates through a solenoid operated fuel flow metering valve 24 in main and low-speed wells 26 and 28 which are arranged in parallel with each other. The restriction or orifice 22 is calibrated to determine the maximum rate of flow of the fuel to be passed through the valve 24, which is operative to control the flow rate of the fuel to be supplied from the float bowl 16 to the main and low-speed wells 26 and 28 in accordance with a signal impressed thereon. The main and low-speed wells 26 and 28 are respectively in communication with air bleed passageways 30 and 32 which are vented from the atmosphere through solenoid operated air metering valves 34 and 36, respectively. The valves 34 and 36 are operative to regulate the flows of air to be admixed to the fuel in the main and low-speed wells 26 and 28, respectively, by signals respectively impressed thereon. The main well 26 communicates with a main fuel outlet passageway 38 which terminates in a main fuel discharge nozzle 40 projecting into the venturi 12, whereas the low-speed well 28 communicates with a low-speed fuel outlet passageway 42 which terminates through a solenoid operated fuel flow control valve 44 in a low-speed fuel discharge port 46 which is open into the mixture delivery pipe 10 in close proximity to the throttle valve 14 in a fully closed position. An additional fuel supply passageway 48 leads from the float bowl 16 through a restriction or orifice 50 and terminates through a solenoid operated fuel flow control valve 52 in an additional fuel discharge port 54 which is open into the mixture delivery pipe 10 downstream of the throttle valve 14. The restriction or orifice 50 is calibrated to be predominant over the maximum rate of flow of the fuel to be passed through the valve 52, which is actuated to open in response to acceleration or cold driving conditions of the engine and is operative to meter the fuel to be supplied to the engine additionally to the fuel injected into the mixture delivery pipe 10 during acceleration or cold driving of the engine. The throttle valve 14 is bypassed by an additional air supply passageway 56 which has an inlet port 58 located upstream of the venturi 12 and an outlet port 60 located downstream of the throttle valve 14. The inlet and outlet ports 58 and 60 are in communication with each other through a solenoid operated air flow control valve 62 which is actuated in response to deceleration conditions of the engine for supplying additional air to the intake manifold of the engine so that the vacuum developed in the intake manifold during deceleration of the engine is lessened.

All the above-mentioned solenoid operated valves 24, 34, 36, 44, 52 and 62 are assumed to be of the two-position or binary-acting type, each having only a fully open position and a fully closed position. Each of the valves has an intrinsic non-linear signal-to-output characteristic resulting from, for example, the resistance exerted on the flow of the fuel being passed therethrough and the forces of inertia imparted to the armature and the valve head constituting the valve. Each valve is actuated to open and close at timings and for durations which are controlled to provide a desired third flow rate pertinent to the varying operating conditions of the engine. Such timings and durations are formulated in accordance with schedules which vary from one of the valves to another and, thus, it is not a matter of concern in the present invention how to formulate such schedules.

FIG. 2 illustrates an example of an electric control circuit which may be used to control each of the above described valves. The control circuit comprises an analog signal generator 64 and a dither signal generator 66. An example of an exhaust sensor of the type suitable for use as the signal generator 64 is shown in U.S. Pat. No. 3,827,237 to Linder et al and illustrated in FIG. 4*a* thereof. Examples of signal generators of the type suitable for use as the dither signal generator 66 are depicted in Smith, "Modern Operational Circuit Design," pages 215–225, Wiley-Interscience, New York, N. Y. (1971). The analog signal generator 64 delivers a basic analog signal Sa an example of which is illustrated in FIG. 3*a.* The analog signal Sa is a continuous representation of any operational variable such as a desired flow rate of fluid through each or one of the fluid flow control valves shown in FIG. 1 and may be derived from the detected concentration of exhaust gases from an engine, thus continuously varying with a certain variable such as time as indicated in FIG. 3*a.* The dither signal generator 66 delivers a steady-state dither signal Sd which is assumed, for the purpose of illustration, to have a regular triangular waveform having a predetermined oscillation frequency indicated in FIG. 3*b.* The signals Sa and Sd thus delivered from the signal generators 64 and 66, respectively, are fed to an adder 68, which produce an output signal St which is a representation of the sum of the input signals Sa and Sd, as indicated in FIG. 3*c.* An example of an adder circuit suitable for use as the adder 68 is illustrated in Smith, op. cit., page 150, FIG. 12.3. The output signal St of the adder 68 is fed to a comparator 70 on which is constantly impressed a fixed reference signal Sr from a terminal 72. An example of a comparator suitable for use as the comparator 70 is disclosed in Smith, op. cit., pages 181, 182 and FIGS. 13.6, 13.7. The comparator 70 is operative to compare the two input signals St and Sr with each other and produce a binary control signal Sc when the signal St produced by the adder 68 is greater in magnitude than the reference signal Sr. As indicated in FIG. 3*d*, the binary control signal Sc is in the form of a train of square-shaped pulses with variable pulsewidth or duration. The control signal Sc thus produced from the comparator 70 is fed to the solenoid operated flow control valve to be controlled. As an alternative to the signal St delivered from the adder 68, a signal may be used which is produced by directly comparing the basic control signal Sa with the dither signal Sd so that a train of pulses analogous to the signal St is delivered.

The binary control signal Sc is a modified and digital version of the initially given basic analog signal Sa. If, therefore, the binary control signal Sc is of such a nature as to provide linear signal-to-output characteristic in a fluid flow control valve having a linear intrinsic signal-to-output characteristic, then the valve will produce a linear flow characteristic in response to the control signal Sc so that the actual flow rate of fluid through the valve will vary linearly with respect to the theoretical flow rate which is dictated by the control signal Sc as indicated by a plot *a* in FIG. 4. If, however, the control signal Sc is fed to a solenoid operated flow control valve which actually has linear intrinsic signal-to-output characteristic, the rate of flow of the fluid through the valve will vary nonlinearly with respect to the theoretical flow rate dictated by the control signal Sc in each of the cycles in which the valve is actuated to open and close, as indicated by a curve *b* or *c* in FIG. 4 depending upon the specific performance characteristics of the valve (assuming that the valve involves substantially no time lag before the valve is initiated into action in response to each of the control signals applied thereto). If, therefore, the valve is actuated to open or close from the fully closed or open condition, respectively, in such a manner that the opening degree of the valve varies under the control of the signal Sc providing a linear signal-to-output characteristic, then the flow rate achieved by the valve for the duration of each of the pulses forming the control signal Sc will vary non-linearly with respect to the basic analog signal Sa. In view of the fact that the control signal Sc obtained by modifying the basic analog signal Sa with the dither signal Sd is merely effective to dictate the ratio between the durations in which the valve is open and closed, the valve will thus be unable to provide flow characteristics following the analog signal Sa even though the pulses constituting the control signal Sa are supplied in succession to the valve.

FIG. 5*a* shows part of the dither signal Sd having the regular triangular waveform as indicated in FIG. 3*b* and FIG. 5*b* shows the relationship between the flow rate F achieved when the initially given analog signal Sa is faithfully followed and the flow rate G achieved when the analog signal Sa is modified by the dither signal Sd. From FIG. 5*b* it is seen that the dither signal Sd having a regular triangular waveform provides a linear signal-to-output characteristic so that, if a fluid flow control valve having a nonlinear signal-to-output characteristic is supplied with the control signal Sc resulting from such a dither signal, the valve produces a non-linear signal-to-output characteristic partaking of the non-linearity of the intrinsic signal-to-output characteristic of the valve.

Figure 7A:
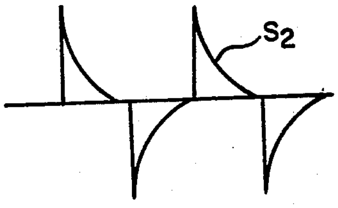
Figure 7B:
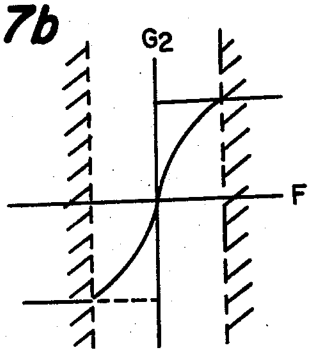
Figure 8A:
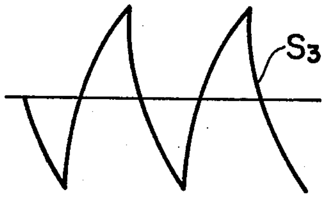
Figure 8B:
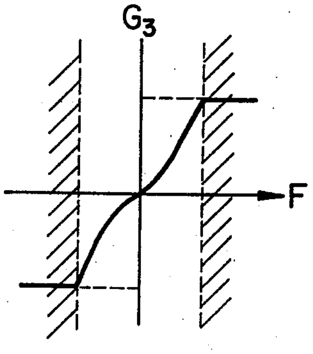

FIGS. 6*a*, 7*a* and 8*a* show preferred examples of dither signals $S_1$, $S_2$ and $S_3$ which can also be used to modify a basic analog signal such as the signal Sa illustrated in FIG. 3a. The dither signal $S_1$ shown in FIG. 6*a* has a sinusoidal waveform and the dither signal $S_2$ shown in FIG. 7*a* has a waveform which is obtained by differentiating a square wave with respect to time. The dither signal $S_3$ shown in FIG. 8*a* has a waveform which is derived from a first-order lag wave from a square wave. FIGS. 6*b*, 7*b* and 8*b* illustrate the relations between the above-mentioned flow rate F and flow rates $G_1$, $G_2$ and $G_3$ which are respectively achieved when the basic analog signal Sa is modified with the dither signals $S_1$, $S_2$ and $S_3$. When the dither signal $S_1$ having the sinusoidal waveform is utilized for modifying the basic analog signal Sa, the resultant binary control signal Sc has a property providing a non-linear signal-to-output characteristic which is substantially complementary to a non-linear signal-to-output characteristic of the nature indicated by curve *b* in FIG. 4 with respect to a suitable linear signal-to-output characteristic such as indicated by plot *a* in FIG. 4. When, on the other hand, the dither signal $S_2$ having the waveform shown in FIG. 7*a* is used modify the analog basic signal Sa, the resultant binary control signal Sc has a property providing a non-linear signal-to-output characteristic substantially complementary to a non-linear signal-to-output characteristic of the nature indicated by curve *c* in FIG. 4 with respect to a suitable linear signal-to-output characteristic such as indicated by the plot *a* in FIG. 4. in the case of the dither signal $S_2$ illustrated in FIG. 7*a*, the dither signal may have a frequency equal to that of the dither signal Sd having the regular sawtooth waveform but the pulses forming the binary control signal resulting from the dither signal $S_2$ (indicated by dot-and-dash lines in FIG. 3*b*) differ in durations or pulsewidth from the pulses constituting the control signals Sc resulting from the dither signal Sd so that the ratio between the durations in which the valve controlled by the use of the dither signal $S_2$ is open and closed differs from that achieved when the dither signal Sd is used. If, thus, the dither signals $S_1$ and $S_2$ providing the flow characteristics shown in FIGS. 6*b* and 7*b*, especially those characteristics of the curves on the first quadrants, are utilized for the control of two-position solenoid operated flow control valves intrinsically having the particular non-linear signal-to-output characteristics indicated by the curves *b* and *c*, respectively in FIG. 4, then the intrinsic non-linear singal-to-output characteristics will be compensated for or corrected by the signal-to-output characteristics shown in FIGS. 6*b* and 7*b* so that the valve will be capable of providing a linear effective signal-to-output characteristic approximating the characteristics indicated by the plot *a* in FIG. 4. As an alternative to the dither signal $S_3$ shown in FIG. 8*a*, a dither signal having a waveform which is a second-order lag wave of a square wave may be utilized. The dither signal having the first-order or second-order lag waveform of a square wave can be readily modified by selecting the resistance of a capacitance-resistance circuit to produce the waveform and is for this reason preferable to the dither signals shown in FIGS. 6*a* and 7*a*.

If desired, the dither signals proposed by the present invention may be utilized not only for the control of a two-position valve but for the control of a solenoid operated flow control valve of the type having intrinsic linear signal-to-output characteristics so as to produce apparently non-linear flow characteristics which may be scheduled to compensate for those characteristics for which the valve per se is not responsible such as, for example, the flow characteristics inherent in the conduits or other passageway means connected to the valve. For the same reason, the dither signals proposed by the present invention may be used for the control of the intrinsically non-linear solenoid operated flow control valve for modifying the intrinsic linear signal-to-output characteristics of the valve into otherwise non-linear flow characteristics.

The valve controlled by the succession of the digital control signal will produce an intermittent flow of fluid at the output thereof but such an intermittent flow is smoothed out as the fluid is passed through the passageway leading from the valve and is thus eventually converted into a continuous flow. When, furthermore, the dither signals proposed by the present invention are utilized for the control of an intrinsically linear solenoid operated valve, the valve head constituting the valve will be intermittently driven by the armature. Such intermittent motions of the valve head are, however, smoothed out by reason of the forces of inertia acting on the armature and the valve head and other mechanical actions to which the armature and/or the valve head may be subjected.

What is claimed is:

1. A method of controlling a solenoid-operated fluid flow control valve having a non-linear intrinsic signal-to-output characteristic, comprising (1) producing an analog basic signal representative of a desired flow rate of fluid through said control valve, (2) producing a steady-state dither signal having a predetermined oscillation frequency, (3) modifying said basic signal with said dither signal for producing a binary control signal digitally representative of a modified version of said basic signal, said dither signal having a waveform which is selected so that said control signal provides a non-linear compensating signal-to-output characteristic which is substantially complementary to said intrinsic signal-to-output characteristic with respect to a linear desired signal-to-output characteristic, and (4) controlling said valve with said binary signal to compensate for said intrinsic signal-to-output characteristic into a substantially linear effective signal-to-output characteristic substantially identical with said desired signal-to-output characteristic of said control valve and thereby enabling the control valve to provide therethrough an effective fluid flow rate which is substantially equal to said desired flow rate.

2. A method as set forth in claim 1, in which said waveform of said dither signal is produced by differentiating a square wave with respect to time.

3. A method as set forth in claim 1, in which said waveform of said dither signal is a first-order lag wave of a square wave.

4. A method as set forth in claim 1, in which said binary control signal is produced by combining said analog basic signal and said dither signal for producing an output signal representative of the sum of the basic and dither signals, and comparing said output signal with a fixed reference signal for producing a train of pulses as said binary control signal when said output signal is in predetermined relationship to said reference signal.

5. A method as set forth in claim 1, in which said binary control signal is produced by comparing said analog basic signal with said dither signal for producing a train of pulses as said binary control signal when said analog basic signal is in predetermined relationship to said dither signal.

6. A device for controlling a solenoid-operated fluid flow control valve having a non-linear intrinsic signal-to-output characteristic, comprising (1) means for producing an analog basic signal representative of a desired flow rate of fluid through said control valve, (2) dither signal supply means for producing a steady-state dither signal having a predetermined oscillation frequency, (3) modifying means for modifying said basic signal with said dither signal for producing a binary control signal digitally representative of a modified version of said basic signal, said dither signal supply means being such that the dither signal to be thereby produced has a waveform which is selected so that said control signal provides a non-linear compensating signal-to-output characteristic which is substantially complementary to said intrinsic signal-to-output characteristic with respect to a linear desired signal-to-output characteristic of said control valve, and (4) means responsive to said control signal for controlling said valve to compensate for said intrinsic signal-to-output characteristic into a substantially linear effective signal-to-output characteristic substantially identical with said desired signal-to-output characteristic of said control valve for thereby enabling the control valve to provide therethrough an effective fluid flow rate which is substantially equal to said desired flow rate.

7. A device as set forth in claim 6, in which said modifying means comprises means for combining said analog basic signal and said dither signal for producing an output signal representative of the sum of the basic and dither signals, and means for comparing said output signal with a fixed reference signal for producing a train of pulses as said binary control signal when said output signal is in predetermined relationship to said reference signal.

8. A device as set forth in claim 6, in which said modifying means comprises means for comparing said analog basic signal and said dither signal for producing a train of pulses as said binary control signal when the analog basic signal is in predetermined relationship to said dither signal.

* * * * *